United States Patent
Wang et al.

(10) Patent No.: US 10,623,351 B2
(45) Date of Patent: Apr. 14, 2020

(54) MESSAGING SYSTEM AND METHOD THEREOF

(71) Applicant: HTC Corporation, Taoyuan (TW)

(72) Inventors: Pei-Lin Wang, Taoyuan (TW); Wei-Ta Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 1057 days.

(21) Appl. No.: 14/663,467

(22) Filed: Mar. 20, 2015

(65) Prior Publication Data

US 2015/0281147 A1    Oct. 1, 2015

Related U.S. Application Data

(60) Provisional application No. 61/972,434, filed on Mar. 31, 2014.

(51) Int. Cl.
*H04L 12/58* (2006.01)
*H04M 1/725* (2006.01)
*H04M 1/67* (2006.01)

(52) U.S. Cl.
CPC .............. *H04L 51/06* (2013.01); *H04L 51/24* (2013.01); *H04M 1/67* (2013.01); *H04M 1/7253* (2013.01); *H04M 1/72552* (2013.01); *H04M 1/72563* (2013.01)

(58) Field of Classification Search
CPC ....... H04L 51/00–51/38; H04M 1/67–1/72563
See application file for complete search history.

(56) References Cited

U.S. PATENT DOCUMENTS

| 2009/0210536 A1* | 8/2009 | Allen | H04M 3/58 709/227 |
| 2011/0021178 A1* | 1/2011 | Balasaygun | G10L 17/26 455/413 |
| 2012/0317135 A1* | 12/2012 | Jin | G06F 21/6218 707/769 |

(Continued)

FOREIGN PATENT DOCUMENTS

| EP | 2144148 A2 | 1/2010 |
| EP | 2242240 A1 | 10/2010 |
| EP | 2291987 B1 | 8/2012 |

OTHER PUBLICATIONS

Corresponding European Office Action dated Jun. 16, 2016.
Corresponding European Search Report that these art references were dated Jul. 13, 2015.

*Primary Examiner* — Clayton R Williams
(74) *Attorney, Agent, or Firm* — CKC & Partners Co., LLC (57) ABSTRACT

A messaging system and method thereof are disclosed herein. The messaging method is suitable for the messaging system, in which the messaging system includes a first electronic device and a second electronic device. The messaging method includes the following steps: determining a latest messaging task executed on the first electronic device; displaying a notification icon corresponding to an application program on a display module of the second electronic device, in which the application program is related to the latest messaging task; detecting a confirmation input corresponding to the notification icon; and launching the application program on the second electronic device according to the confirmation input.

14 Claims, 6 Drawing Sheets

(56) References Cited

U.S. PATENT DOCUMENTS

| | | | |
|---|---|---|---|
| 2012/0330658 A1* | 12/2012 | Bonforte | H04W 4/206 704/235 |
| 2013/0290494 A1* | 10/2013 | Goudarzi | H04L 65/1046 709/219 |
| 2013/0332856 A1* | 12/2013 | Sanders | G06F 3/0481 715/753 |
| 2013/0344917 A1* | 12/2013 | Sobti | H04M 1/0254 455/557 |
| 2014/0143791 A1* | 5/2014 | Mark | G06F 9/485 719/318 |
| 2014/0173447 A1* | 6/2014 | Das | G06F 3/04842 715/738 |
| 2015/0341686 A1* | 11/2015 | Wen | H04N 21/25808 725/109 |

* cited by examiner

MESSAGING SYSTEM AND METHOD THEREOF

RELATED APPLICATIONS

This application claims the priority benefit of U.S. Provisional Application Ser. No. 61/972,434, filed Mar. 31, 2014, which is herein incorporated by reference.

BACKGROUND

Field of Invention

The present disclosure relates to a messaging system. More particularly, the present disclosure relates to a messaging method for a messaging system.

Description of Related Art

Recently, with the advance technologies in portable devices and wireless communication, instant messaging application programs for mobile devices and wearable devices have captured much attention. In addition, since the transmission/reception rate of the mobile communication is significantly increasing, the instant messaging application programs are intended to replace regular phone calls as the mediums of communication between people.

Due to the limited size and input modules of the wearable devices, operations of the instant messaging application programs for the wearable devices are inconvenience. Accordingly, people still need mobile devices equipped with larger displays and with more input modules so as to implement different functions of the instant messaging application programs.

However, continuously switching from the wearable device to the mobile device for messaging requires unnecessary and complicated steps. For instance, when a user is sending/receiving messages to/from a target contact on a wearable device, if the user would like to send a picture stored in the mobile device to the target contact, the user is first required to switch the mobile device from a standby mode to a normal mode. Subsequently, the user needs to find a location of the instant messaging application program and also the corresponding information of the target contact so as to send the picture stored in the mobile device to the target contact.

As a result, there is a need to provide a more intuitional messaging system and method thereof to assist the user in messaging on different devices continuously.

SUMMARY

The disclosure provides a messaging method which is suitable for a messaging system, in which the messaging system includes a first electronic device and a second electronic device. The messaging method includes the following steps: determining a latest messaging task executed on the first electronic device; displaying a notification icon corresponding to an application program on a display module of the second electronic device, in which the application program is related to the latest messaging task; detecting a confirmation input corresponding to the notification icon; and launching the application program on the second electronic device according to the confirmation input.

The disclosure provides a messaging system, in which the messaging system includes a first electronic device and a second electronic device, and the second electronic device is paired with the first electronic device. The first electronic device includes an input module, a processing module and a non-transitory computer-readable medium. The second electronic device includes a display module, an input module, a processing module and a non-transitory computer-readable medium. The non-transitory computer-readable medium of the first electronic device includes one or more sequences of instructions to be executed by the processing module for determining a latest messaging task executed on the first electronic device. The non-transitory computer-readable medium of the second electronic device includes one or more sequences of instructions to be executed by the processing module for displaying a notification icon corresponding to an application program on the display module, in which the application program is related to the latest messaging task. The input module of the first electronic device or the input module of the second electronic device is configured to detect a confirmation input corresponding to the notification icon, and the processing module of the second electronic device is configured to launch the application program according to the confirmation input.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, etc. may be used herein to describe various devices, these devices should not be limited by these terms. These terms are only used to distinguish one device from another device. Thus, a first device could be termed a second device without departing from the teachings of the present disclosure.

Figure 1:
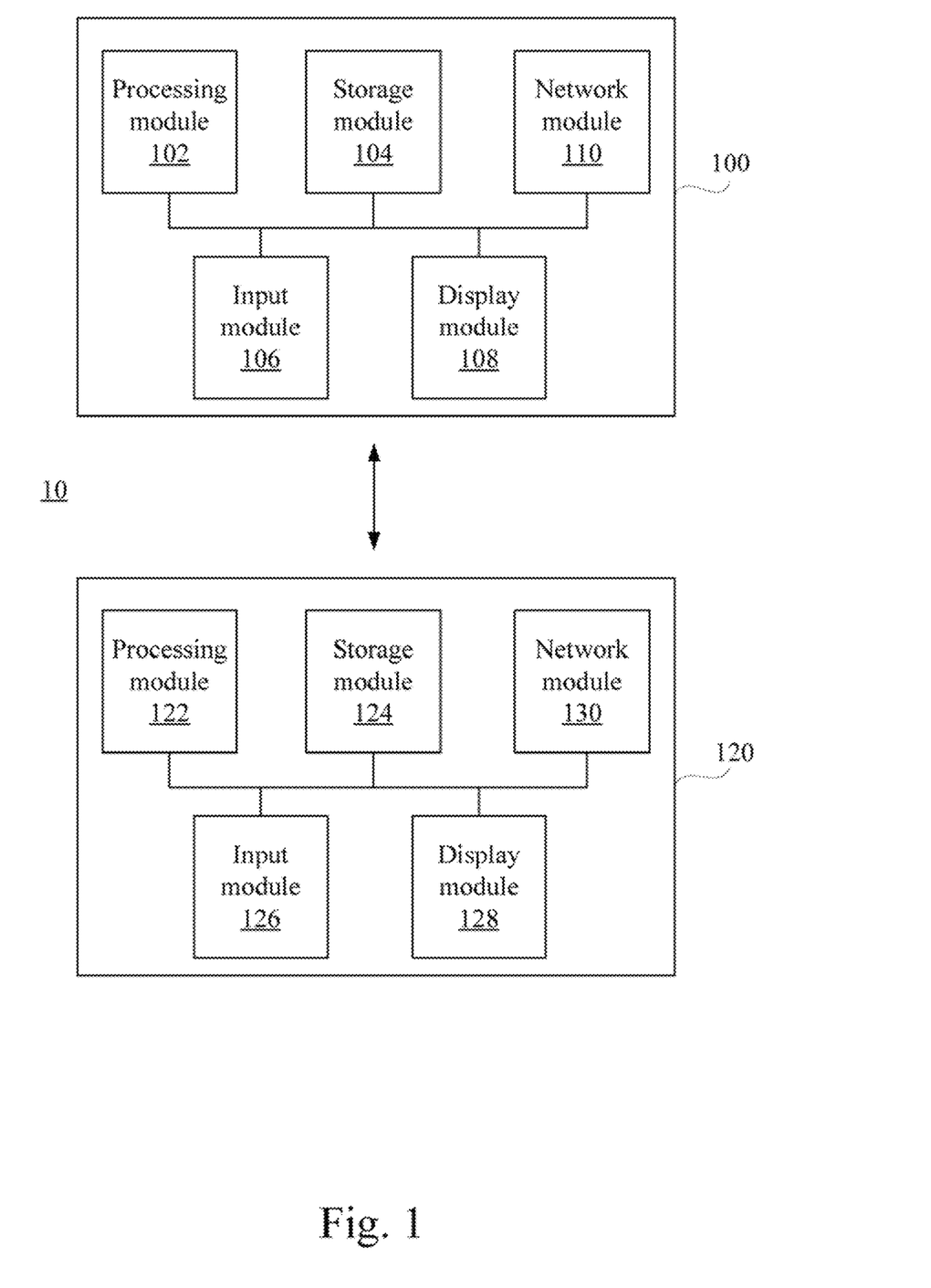
FIG. 1 is a schematic diagram illustrating a messaging system according to one embodiment of this disclosure.

Reference is made to FIG. 1, which is a schematic diagram illustrating a messaging system 10 according to one embodiment of this disclosure is presented. The messaging system 10 includes a first electronic device 100 and a second electronic device 120. The first electronic device 100 is paired with the second electronic device 120 through a short-range wireless network.

In some embodiments, the first electronic device 100 may be a wearable device or an accessory. In some embodiments, the second electronic device 120 may be a mobile device, a tablet or a notebook.

The first electronic device 100 includes a processing module 102, a storage module 104, an input module 106, a display module 108 and a network module 110. The second electronic device 120 includes a processing module 122, a storage module 124, an input module 126, a display module 128 and a network module 130. The processing module 102 is electrically coupled to the storage module 104, the input module 106, the display module 108 and the network module 110. The processing module 122 is electrically coupled to the storage module 124, the input module 126, the display module 128 and the network module 130.

The processing module 102 is configured to load and execute at least one program code from the storage module 104 and to control the network module 110 for data transmission. In addition, the processing module 102 is configured to receive signals transmitted from the input module 106, and the processing module 102 is also configured to transmit signals to the input module 106 and the display module 108 respectively.

In some embodiments, the processing module 102 is further configured to load and execute another program code stored in an externally connected device.

The storage module 104 is configured to store at least one program code, in which the program code includes one or more sequences of instructions. In the present embodiment, the storage module 104 includes one or more sequences of instructions to be executed by the processing module 102 for determining a latest messaging task executed on the first electronic device 100, in which the latest messaging task is the most recent or the ongoing messaging task executed on the first electronic device.

In some embodiments, the latest messaging task may be a chat window with a contact or a chat room with a group of contacts.

In some embodiments, the latest messaging task may be a notification of a new incoming email.

The input module 106 is configured to detect at least one input and to transmit a detecting signal corresponding to the input to the processing module 102. In some embodiments, the input module 106 may be a touch-sensitive module or a voice input module. In other words, the input may be touches or voices.

The display module 108 is configured to display images or videos according to display signals transmitted from the processing module 102. In some embodiments, the display module 108 may be a notification LED (light emitting diode), a display panel with a limited size or a microprojector.

In some embodiments, the display module 108 and the input module 106 may be integrated into a touch display unit, in which the touch display unit may be a touch display panel.

The network module 110 is configured to couple with the second electronic device 120 through the short-range wireless network. In some embodiments, the short-range wireless network may be Bluetooth, NFC or Wi-Fi direct.

The processing module 122 is configured to load and execute at least one program code from the storage module 124. Moreover, the processing module 122 is configured to receive signals transmitted from the input module 126, and the processing module 122 is also configured to transmit signals to the input module 106 and the display module 108 respectively.

In some embodiments, the processing module 122 is configured to load and execute another program code from an externally connected device.

The storage module 124 is configured to store at least one program code, in which the program code includes one or more sequences of instructions. In the present embodiment, the storage module 124 includes one or more sequences of instructions to be executed by the processing module 122 for displaying a notification icon corresponding to an application program on the display module 128, in which the application program is related to the latest messaging task. It should be noted that capacity of the storage module 104 is usually smaller than capacity of the storage module 124. Therefore, photos or files are normally stored in the storage module 124.

In some embodiments, the application program may be an application program to which the latest messaging task belongs.

In some embodiments, the application program may be an application program supporting the latest messaging task. For example, the application program supporting the latest messaging task may be "Photo Gallery" or "File Explorer" such that the user can select images and files in the second electronic device 120.

In some embodiments, when the notification icon is displayed on the display module 128, the second electronic device 120 pre-launches the application program corresponding to the notification icon for a predetermined time period, which makes the user to launch the application program faster when a confirmation input corresponding to the notification icon is detected by the input module 126.

In some embodiments, the notification icon corresponding to the application program is displayed when the second electronic device 120 is switched from a standby mode for a power off mode) to a lock screen mode (or a power on mode), in which the modes are switched by detecting the activation input, and the activation input is detected by the input module 126. For example, if the latest messaging task is a notification of new incoming emails, the display module 128 of the second electronic device 120 displays content of the new incoming emails when the second electronic device 120 is switched to the lock screen mode.

In an embodiment, the activation input can be generated in response to that the user presses a power button of the second electronic device 120 for switching the second electronic device 120 from the power off mode to the power on mode. In another embodiment, the activation input can be generated in response to that the user swipes over a touch panel (e.g. the input module 126) of the second electronic device 120 for switching the second electronic device 120 from the standby mode to the lock screen mode.

In this disclosure, when the second electronic device 120 is waken up (or powered on) in response to the activation input, the second electronic device 120 will receives some information about current working state (or previous working state just before the activation) of the first electronic device 100, such that reasons why the user wakes up (or powers on) the second electronic device 120 can be acknowledged. Afterward, the second electronic device 120 can launch an application/function corresponding to aforesaid reasons (e.g., the intentions of the user).

The input module 126 is configured to detect at least one input and to transmit a sense signal corresponding to the input to the processing module 122. In some embodiments, the input module 126 may be a touch-sensitive module or a voice input module. In other words, the input may be touches or voices.

The display module 128 is configured to display images or videos according to display signals transmitted from the processing module 122.

In some embodiments, the display module 128 and the input module 126 may be integrated into a touch display unit, in which the touch display unit may be a touch display panel.

The network module 130 is configured to couple with the second electronic device 120 through the short-range wireless network. In more details, the network module 130 of the second electronic device 120 is configured to pair with the network module 110 of the first electronic device 100. It should be noted that the second electronic device 120 also includes another network module which is configured to transmit or receive data through a long-range wireless network.

In the present embodiment, when the user messages with a contact using the first electronic device 100, messages are first sent to the second electronic device 120 through the short range wireless network, and the messages are then sent to the contact through the long-range network and the related network, e.g., related core network and the network which the contact uses.

In some embodiments, the long-range wireless network may be a Wi-Fi, a 2G (TDMA based), a 3G (CDMA based), a 4G (OFDMA based) or a 5G wireless communication network.

In some embodiments, the network module 130 and another network module may be integrated into a single module or be separately disposed in the second electronic device 120.

In the present embodiment, the input module 106 of the first electronic device 100 or the input module 126 of the second electronic device 120 is configured to detect a confirmation input corresponding to the notification icon, and the processing module 122 of the second electronic device 120 is configured to launch the application program corresponding to the notification icon according to the confirmation input. When the input module 126 detects the confirmation input, the processing module 122 launches the application program.

In some embodiments, after the processing module 102 determines the latest messaging task executed on the first electronic device 100, the processing module 122 analyzes context of at least one message in the latest messaging task. In another embodiment, the context can be analyzed by the processing module 102, and then analyzed results are transmitted to the second electronic device 120. If the context of the message matches one of predetermined tags corresponding to multiple application programs, the second electronic device 120 is configured to display the notification icon corresponding to the application program of the matched tag on the display module 128.

In some embodiments, the processing module 122 of the second electronic device 120 is configured to pre-launch the application program for a predetermined time period if the context of the message is related to the application program.

In some embodiments, when the input module 126 detects the confirmation input, the second electronic device 120 sends a control signal to the first electronic device 100, and the display module 108 of the first electronic device 100 displays a home screen, or the first electronic device 100 is switched to the standby mode according to the control signal.

Figure 2:
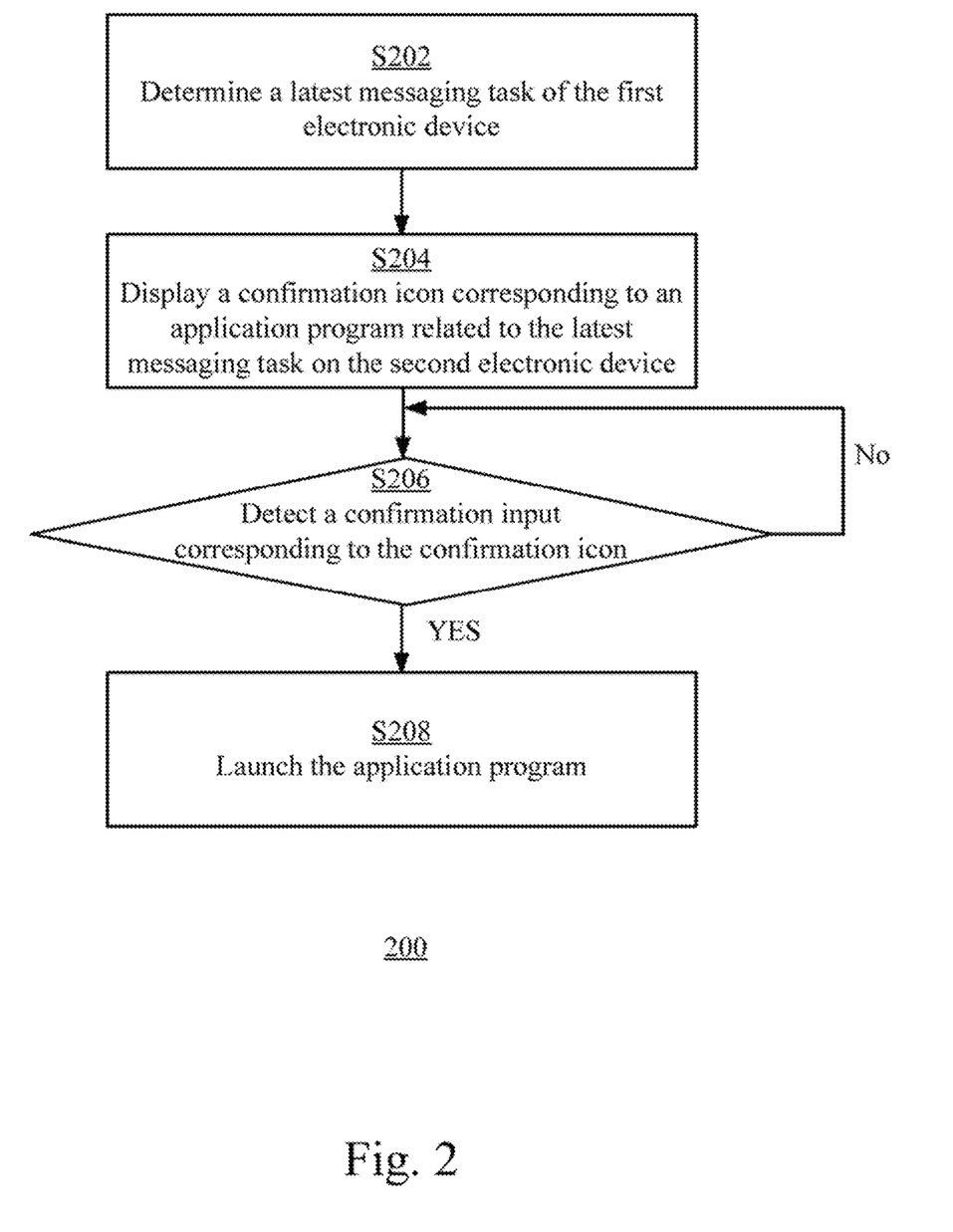
FIG. 2 is a flow diagram illustrating a messaging method according to one embodiment of this disclosure.

Reference is also made to FIG. 2, which is a flow diagram illustrating flows of a messaging method 200 according to one embodiment of this disclosure is presented. The messaging method 200 is suitable for the messaging system 10, i.e., the first electronic device 100 and the second electronic device 120.

In step S202, the processing module 102 determines the latest messaging task executed on the first electronic device 100.

In step S204, the display module 128 of the second electronic device 120 displays the notification icon corresponding to an application program, in which the application program is related to the latest messaging task.

In step S206, the input module 126 or the input module 106 is configured to detect a confirmation input corresponding to the application program. If one of the input modules 126, 106 detects the confirmation input corresponding to the application program, the flow goes to step S208. Otherwise, the input module 106 is configured to keep detecting the confirmation input corresponding to the application program.

In step S208, the processing module 122 of the second electronic device 120 launches the application program corresponding to the notification icon according to the confirmation input.

Based on the aforesaid embodiments, the messaging system 10 and the messaging method 200 makes it more intuitive for the user to chat continuously on different electronic devices, e.g., the first electronic device 100 and the second electronic device 120.

Figure 3A:
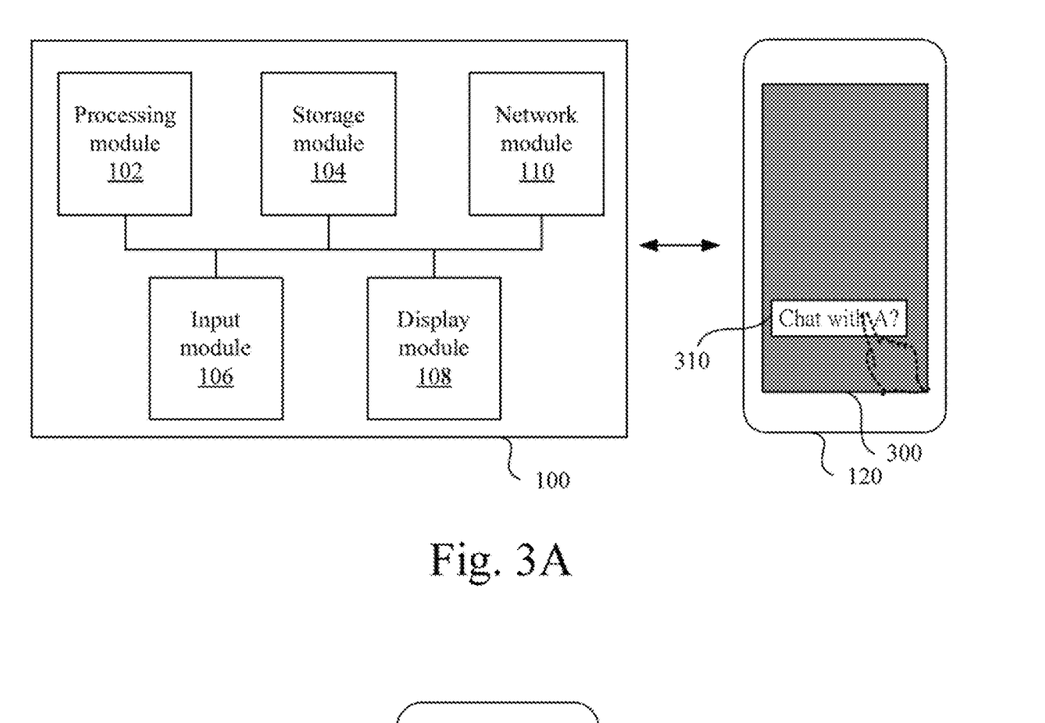
FIGS. 3A-3B are a series of operation flow diagrams illustrating the messaging system according to one embodiment of this disclosure.
Figure 3B:
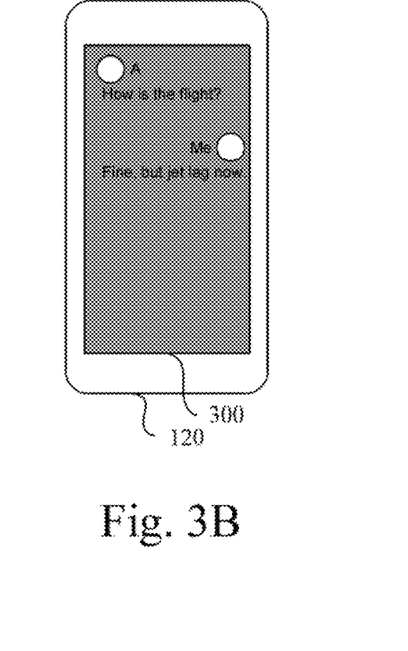

Reference is made to FIGS. 3A-3B, which are a series of operation flow diagrams of the messaging system according to one embodiment of this disclosure. In FIG. 3A, the first electronic device 100 is paired with the second electronic device 120. The first electronic device 100 is configured to chat with a contact A through a short-range wireless network, i.e., the wireless network between the network module 110 and the network module 130, and a long-rang wireless network, i.e., the wireless network between the another network module of the second electronic device 120 and a base station. The input module 126 and the display module 128 of the second electronic device 120 are integrated into a touch display unit 300. In some embodiments, the touch display unit 300 is also called as a touch display panel.

The processing module 102 is configured to determine a latest messaging task (i.e., a chat window with contact A) executed on the first electronic device 100, and the processing module 102 is then configured to send information corresponding to the latest messaging task to the second electronic device 120 by the network module 110, in which the information corresponding to the latest messaging task includes the messages between the user and the contact A.

The network module 130 of the second electronic device 120 is configured to receive the information corresponding to the latest messaging task. The processing module 122 of the second electronic device 120 is configured to send display signals to the touch display unit 300 (an integration of the input module 126 and the display module 128). According to the received information corresponding to the latest messaging task, the touch display unit 300 displays a confirmation icon 310 corresponding to the latest messaging task. The touch display unit 300 is also configured to detect a confirmation input on the confirmation icon 310. When the confirmation input is detected, the touch display unit 300 of the second electronic device 120 displays the chat window with the contact A in FIG. 3B.

Figure 4A:
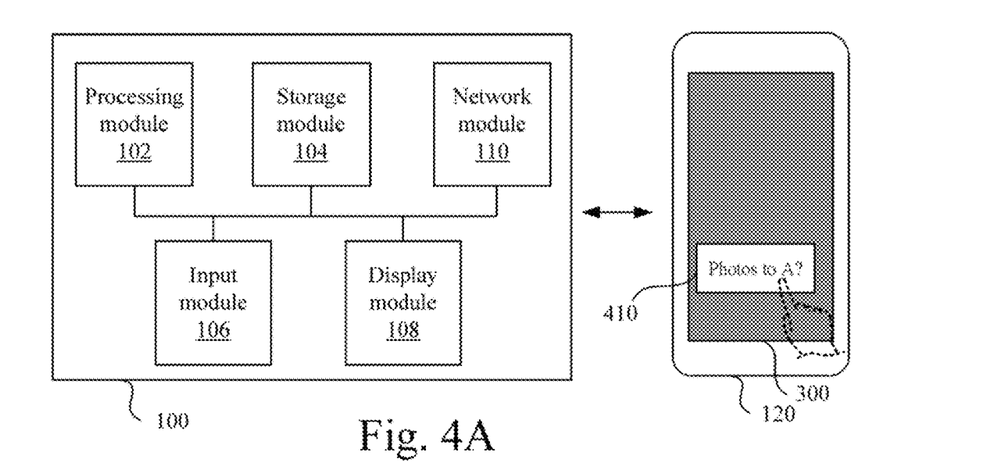
FIGS. 4A-4C are a series of operation flow diagrams illustrating the messaging system according to one embodiment of this disclosure.
Figure 4B:
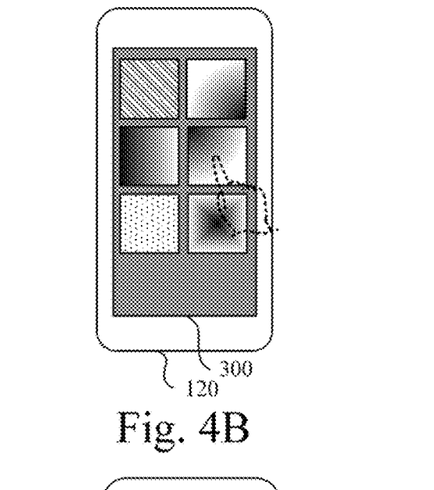
Figure 4C:
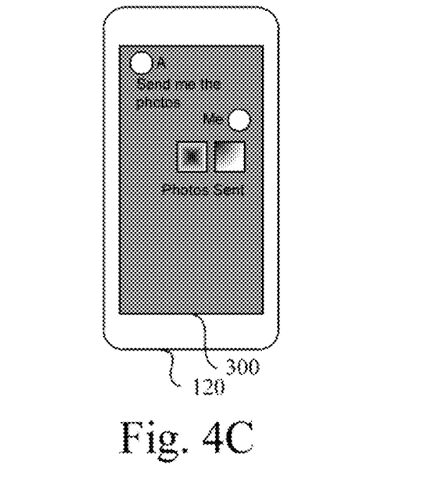

Reference is made to FIGS. 4A-4C, which are a series of operation flow diagrams of the messaging system according to one embodiment of this disclosure is presented. In FIG. 4A, the first electronic device 100 is configured to chat with a contact A. The first electronic device 100 is also paired with the second electronic device 120, and the input module 126 and the display module 128 of the second electronic device 120 are also integrated into a touch display unit 300 in the present embodiment.

The processing module 102 is configured to determine a latest messaging task executed on the first electronic device 100, and the processing module 102 is then configured to send information corresponding to the latest messaging task to the second electronic device 120 using the network module 110.

In the present embodiment, contexts of the messages between the user and the contact A are analyzed by the processing module 102 or by the processing module 122. If context of the messages matches one of predetermined tags, the touch display unit 300 displays a confirmation icon 410 corresponding to an application program of the matched predetermined tag, in which the predetermined tags correspond to multiple application programs. If the contexts of the messages between the user and the contact A are analyzed by the processing module 102, the information corresponding to the latest messaging task includes an activation signal for activating the corresponding application program. If the contexts of the messages between the user and the contact A are analyzed by the processing module 122, the information corresponding to the latest messaging task includes the messages between the user and the contact A.

For example, contexts of text messages between the contact A and the user include a term "photo", and the term "photo" matches a tag "photo" corresponding to an application program "Photo Gallery". Subsequently, the touch display unit 300 displays a confirmation icon 410 corresponding to the application program "Photo Gallery". In FIG. 4B, after the touch display unit 300 detects a confirmation input corresponding to the confirmation icon 410, the touch display unit 300 displays an user interface corresponding to the application program "Photo Gallery" such that the user is available to select at least one photo for sending the at least one photo to the contact A.

Finally, as shown in FIG. 4C, after the at least one photo is selected completely, the at least one photo is sent to the contact A automatically.

Figure 5A:
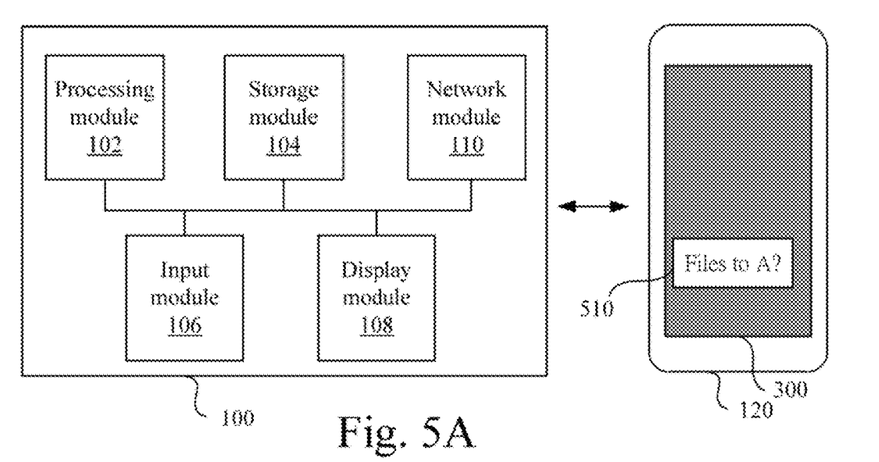
FIGS. 5A-5C are a series of operation flow diagrams illustrating the messaging system according to one embodiment of this disclosure.
Figure 5B:
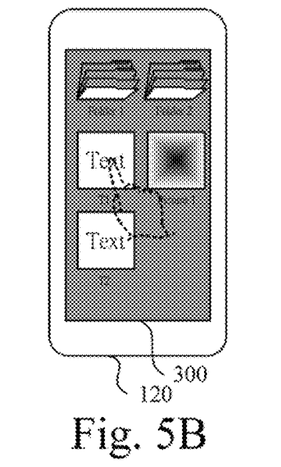
Figure 5C:
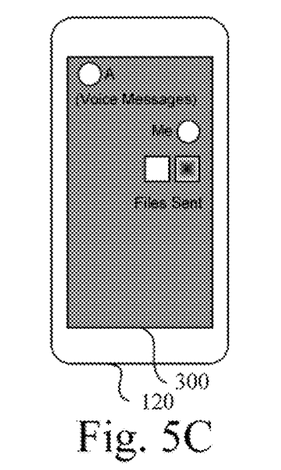

Reference is made to FIGS. 5A-5C, which are a series of operation flow diagrams of the messaging system according to one embodiment of this disclosure. In FIG. 5A, the first electronic device 100 is configured to chat with a contact A. In the present embodiment, the messages between the contact A and the user are the voice messages, and the voice messages are recognized by a voice recognizing application program, in which the voice recognizing application program is stored in the storage module 124 or in storage module 104.

For example, contexts of voice messages between the contact A and the user include a term "docs", and the term "docs" matches a tag "docs" corresponding to an application program "File Explorer". The touch display unit 300 subsequently displays a confirmation icon 510 corresponding to an application program "file explorer". In FIG. 5B, after the touch display unit 300 detects a confirmation input corresponding to the confirmation icon 510, the touch display unit 300 displays an user interface corresponding to the application program "File Explorer" such that the user is available to select at least one file for sending the selected file to the contact A.

As shown in FIG. 5C, after the at least one file is selected completely, the at least one file is sent to the contact A automatically, in which the file may includes a text file and a photo.

Figure 6A:
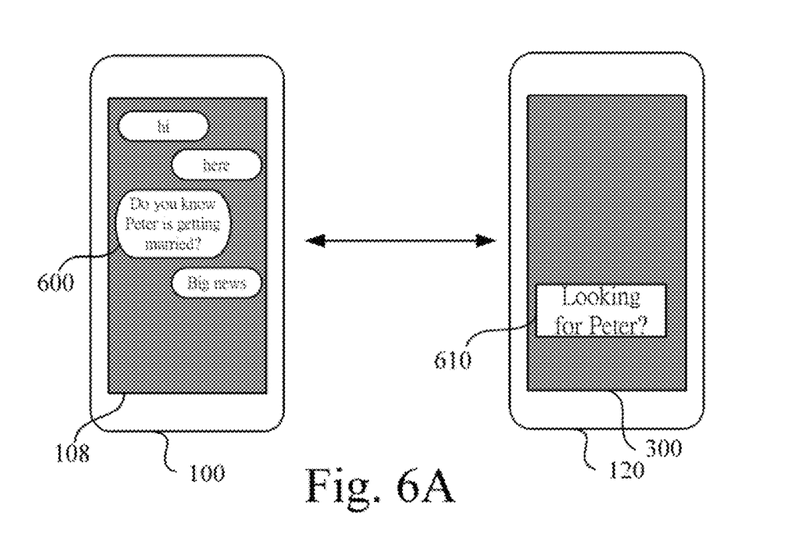
FIGS. 6A-6B are a series of operation flow diagrams of the messaging system according to one embodiment of this disclosure.
Figure 6B:
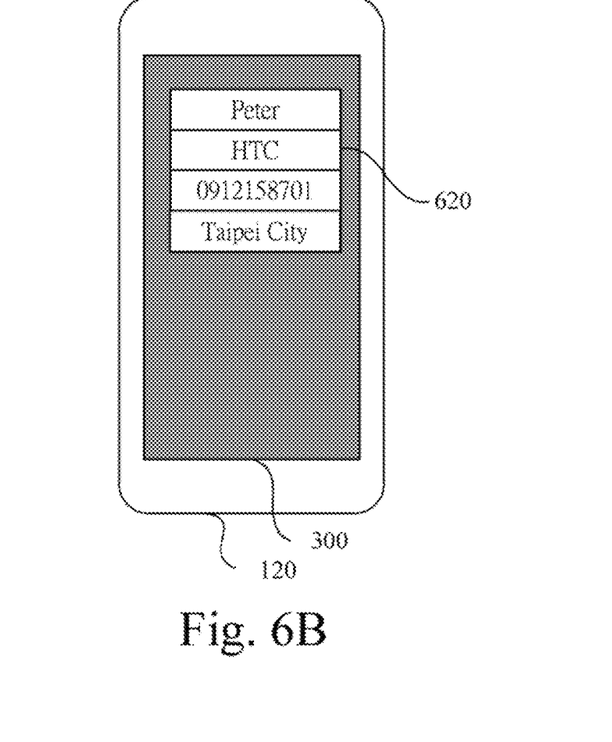

Reference is made to FIGS. 6A-6B, which are a series of operation flow diagrams of the messaging system according to one embodiment of this disclosure. For example, in the embodiment of FIG. 6A, the first electronic device 100 is running an instant messaging (IM) application. In the present embodiment, in response to that conversation messages 600 of the instant messaging (IM) application mentions a name (who is not necessarily the person in the conversation with the user), this name (e.g., "Peter" as shown in the conversation messages 600 of FIG. 6A) appeared in the conversation messages 600 will be recognized by the processing module 102 (or by the processing module 122) by matching the name with an existed contact database on the first electronic device 100 (or the second electronic device 120).

When the second electronic device 120 is activated (waken up or powered on), the second electronic device 120 is able to launch related applications about the recognized name. As shown in FIG. 6A, the touch display unit 300 of the second electronic device 120 displays a confirmation icon 610 showing the name, e.g., "Peter".

In FIG. 6B, after the touch display unit 300 detects a confirmation input corresponding to the confirmation icon 610, the touch display unit 300 displays an user interface 620 corresponding to the application program "Contact List" such that the user can access personal information (e.g., phone numbers, email address, position, company, birthday, etc) of the recognized name "Peter" in the contact database of the first electronic device 100 or the second electronic device 120.

In all the embodiments mentioned above, the processing module 102 and the processing module 122 may respectively be a central processing unit (CPU), a microprocessor or a processing unit.

In all the embodiments mentioned above, the storage module 104 and the storage 124 may respectively be non-volatile memory such as read only memory (ROM), programmable read only memory (PROM), erasable programmable read only memory (EPROM), and electrically erasable programmable read only memory (EEPROM) devices, volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs), and magnetic storage devices such as hard disk drives (HDD) and floppy disk drives.

Based on the aforesaid embodiments, the messaging system 10 and the messaging method 200 make it more intuitional and convenient for the user to chat continuously on different electronic devices or to send files stored in different devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A messaging method, suitable for a messaging system, the messaging system comprising a first electronic device and a second electronic device, wherein the messaging method comprises:
   determining a latest messaging task executed on the first electronic device;
   analyzing context of at least one message in the latest messaging task on the first electronic device;
   determining whether the context of the at least one message matches a predetermined tag corresponding to an application program, wherein the application program relates to the latest messaging task executed on the first electronic device, and the application program is configured to support the latest messaging task;
   transmitting information, corresponding to the latest messaging task taking place on the first electronic device, to the second electronic device if the context of the at least one message is related to the application program;
   displaying a notification icon corresponding to the information on a display module of the second electronic device;
   detecting a confirmation input corresponding to the notification icon by an input module of the second electronic device; and
   launching the application program on the second electronic device according to the confirmation input.

2. The messaging method of claim 1, wherein the step of displaying the notification icon comprises:
   detecting an activation input for switching the second electronic device from a standby mode to a lock screen mode, or for activating the second electronic device from a power off mode to a power on mode; and
   displaying the notification icon corresponding to the application program on the display module of the second electronic device in the lock screen mode.

3. The messaging method of claim 2 further comprising:
   switching the first electronic device to a standby mode according to the confirmation input.

4. The messaging method of claim 1, wherein the at least one message is a voice message, and the step of analyzing the context of the at least one message comprises:
   recognizing the at least one message in voice to generate the context of the at least one message; and
   analyzing the context of the at least one message in the latest messaging task.

5. The messaging method of claim 1, wherein the step of displaying the notification icon comprises:
   displaying the notification icon corresponding to the application program on a display module of the second electronic device if the context of the at least one message matches the predetermined tag corresponding to the application program.

6. The messaging method of claim 1, wherein the step of analyzing the context of the at least one message comprises:
   recognizing a name from the context of the at least one message by matching the name with an existed contact database on the first electronic device.

7. The messaging method of claim 1, wherein the application program includes a plurality of files, and the messaging method further comprises:
   detecting at least one input corresponding to selection of candidate files from the files; and
   sending the candidate files to at least one contact corresponding to the latest messaging task automatically.

8. A messaging system, comprising:
   a first electronic device, comprising:
      an input module;
      a processing module; and
      a non-transitory computer-readable medium comprising one or more sequences of instructions to be executed by the processing module for determining a latest messaging task executed on the first electronic device; and
   a second electronic device paired with the first electronic device, comprising:
      a display module;
      an input module;
      a processing module;
      a non-transitory computer-readable medium comprising one or more sequences of instructions to be executed by the processing module for displaying a notification icon corresponding to an application program on the display module, wherein the application program is related to the latest messaging task; and
   wherein the processing module of the first electronic device is configured to analyze context of at least one message in the latest messaging task on the first electronic device, to determine whether the context of the at least one message matches a predetermined tag corresponding to the application program, wherein the application program is configured to support the latest messaging task, and to transmit information, corresponding to the latest messaging task taking place on the first electronic device, to the second electronic device if the context of the at least one message is related to the application program;
   the display module of the second electronic device is configured to display the notification icon corresponding to the information; the input module of the second electronic device is configured to detect a confirmation input corresponding to the notification icon, and the processing module of the second electronic device is configured to launch the application program according to the confirmation input.

9. The messaging system of claim 8, wherein the step of displaying the notification icon comprises:
   detecting an activation input by the input module of the second electronic device for switching the second electronic device from a standby mode to a lock screen mode, or for activating the second electronic device from a power off mode to a power on mode; and
   displaying the notification icon corresponding to the application program on the display module of the second electronic device in the lock screen mode.

10. The messaging system of claim 9, wherein when the processing module launches the application program corresponding to the notification icon, the first electronic device is switched to a standby mode.

11. The messaging system of claim 8, wherein the at least one message is a voice message, and the processing module of the first electronic device or the processing module is configured to recognize the at least one message in voice to generate the context of the at least one message.

12. The messaging system of claim 8, wherein the step of displaying the notification icon comprises:
   displaying the notification icon of the application program on the display module of the second electronic device if the context of the at least one message matches the predetermined tag corresponding to the application program.

13. The messaging method of claim 8, wherein the processing module of the first electronic device or the processing module of the second electronic device is configured to recognize a name from the context of the at least one message by matching the name with an existed contact database on the first electronic device.

14. The messaging system of claim 8, wherein the application program includes a plurality of files, the input module of the second electronic device is configured to detect at least one input corresponding to selection of at least one candidate file from the files, and the second electronic device is configured to send the at least one candidate file to at least one contact corresponding to the latest messaging tasks automatically.

* * * * *